(12) United States Patent
Khodorkovsky et al.

(10) Patent No.: US 7,624,287 B2
(45) Date of Patent: Nov. 24, 2009

(54) ADAPTIVE POWER STATE MANAGEMENT

(75) Inventors: Oleksandr Khodorkovsky, Toronto (CA); Vladimir Giemborek, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 375 days.

(21) Appl. No.: 11/468,630

(22) Filed: Aug. 30, 2006

(65) Prior Publication Data

US 2008/0059813 A1 Mar. 6, 2008

(51) Int. Cl.
*G06F 1/00* (2006.01)
*G06F 9/44* (2006.01)
*G06F 9/445* (2006.01)
*G05B 13/02* (2006.01)

(52) U.S. Cl. .................. 713/300; 700/52; 717/168; 717/174

(58) Field of Classification Search .......... 713/300; 717/168, 174; 700/52
See application file for complete search history.

(56) References Cited

U.S. PATENT DOCUMENTS

| | | | |
|---|---|---|---|
| 6,950,105 B2 | 9/2005 | Giemborek et al. | |
| 6,952,782 B2 * | 10/2005 | Staiger | 713/300 |
| 7,111,179 B1 * | 9/2006 | Girson et al. | 713/300 |
| 7,287,153 B1 * | 10/2007 | Hamersley | 713/1 |
| 7,506,145 B2 * | 3/2009 | Zenz et al. | 713/1 |
| 2002/0087896 A1 * | 7/2002 | Cline et al. | 713/300 |
| 2004/0003303 A1 * | 1/2004 | Oehler et al. | 713/300 |
| 2005/0071705 A1 | 3/2005 | Bruno et al. | |
| 2005/0195181 A1 | 9/2005 | Khodorkovsky | |
| 2006/0041764 A1 * | 2/2006 | Shih et al. | 713/300 |
| 2007/0079154 A1 * | 4/2007 | Diefenbaugh et al. | 713/300 |

\* cited by examiner

*Primary Examiner*—Mark Connolly
*Assistant Examiner*—Stefan Stoynov
(74) *Attorney, Agent, or Firm*—Vedder Price, P.C.

(57) ABSTRACT

In a power management scheme for a power-consuming (e.g. electronic) device, one of multiple predefined operating parameter sets is selected. Each of the sets comprises multiple operating parameter values for the device. Examples of operating parameters include clock frequency or voltage for example. The selection may be responsive to the detection of an event which warrants a change in a current power consumption state of the device. Any operating parameter value in the selected set that would prevent the device from meeting current operating demands is modified to a new value. The new value may be taken from another operating parameter set. The modified set of parameters is applied to the device in order to change the current power consumption state of the device.

27 Claims, 3 Drawing Sheets

ADAPTIVE POWER STATE MANAGEMENT

FIELD OF TECHNOLOGY

The present disclosure relates to a power management scheme for a power-consuming device.

BACKGROUND

Efficient use of power is an important design objective for many contemporary electronic devices, such as personal computers, notebook or laptop computers, personal digital assistants (PDAs), portable music players and cellular telephones. By limiting the amount of power consumed by a device, benefits such as reduced heat output and prolonged battery life may be achieved.

In a known power management scheme, multiple power consumption states are defined for a device. Each state specifies a unique set of values for a set of operating parameters whose application results in a particular power consumption level for the device. The operating parameters may for example specify a clock frequency to be applied to sequential logic (e.g. a microprocessor) within the device or a particular voltage to be applied to integrated circuitry within the device. Only one of the multiple states is effective at any given moment that the device is operational. Which state is effective depends upon device operating conditions and/or detected events. For example, if it is detected that a device has been disconnected from an alternating current power source and switched to battery power, a low power consumption state may become effective in order to conserve battery power.

It may be desired to define power consumption states encompassing a large number of operating parameters. As the number of operating parameter per state increases, the potential number of unique combinations of operating parameter values (and thus the potential number of power consumption states that may be defined) also increases. Although a large number of states may provide flexibility in managing power consumption, the maintenance of a large number of power consumption states may, disadvantageously, prove to be cumbersome for a designer. Moreover, if it is intended to store representations of the states in a finite amount of memory within the device, memory size limitations may constrain the maximum number of power consumption states to an undesirably low number.

An alternative power management scheme which obviates or mitigates at least some of these shortcomings would be desirable.

SUMMARY OF THE INVENTION

In a power management scheme for a power-consuming (e.g. electronic) device, one of multiple predefined operating parameter sets is selected. Each of the sets comprises multiple operating parameter values for the device. Examples of operating parameters include clock frequency or voltage for example. The selection may be responsive to the detection of an event which warrants a change in a current power consumption state of the device. Any operating parameter value in the selected set that would prevent the device from meeting current operating demands is modified to a new value. The new value may be taken from another operating parameter set. The modified set of parameters is applied to the device in order to change the current power consumption state of the device.

In one aspect, there is provided a method of operating a power-consuming device, comprising: selecting one of a plurality of predefined operating parameter sets, each of the sets comprising a plurality of operating parameter values for the device; modifying to a new value any operating parameter value in the selected set that would prevent the device from meeting current operating demands, the modifying resulting in a modified set of parameters; and applying the modified set of parameters to the device, to change the current power consumption state of the device.

In another aspect, there is provided a power-consuming device, comprising: means for selecting one of a plurality of predefined operating parameter sets, each of the sets comprising a plurality of operating parameter values for the device; means for modifying to a new value any operating parameter value in the selected set that would prevent the device from meeting current operating demands, the modifying resulting in a modified set of parameters; and means for applying the modified set of parameters to the device, to change the current power consumption state of the device.

In yet another aspect, there is provided a machine-readable medium storing machine-executable code for execution by a power-consuming device, comprising: machine-executable code for selecting one of a plurality of predefined operating parameter sets, each of the sets comprising a plurality of operating parameter values for the device; machine-executable code for modifying to a new value any operating parameter value in the selected set that would prevent the device from meeting current operating demands, the modifying resulting in a modified set of parameters; and machine-executable code for applying the modified set of parameters to the device, to change the current power consumption state of the device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment of this invention.

DETAILED DESCRIPTION

Figure 1:
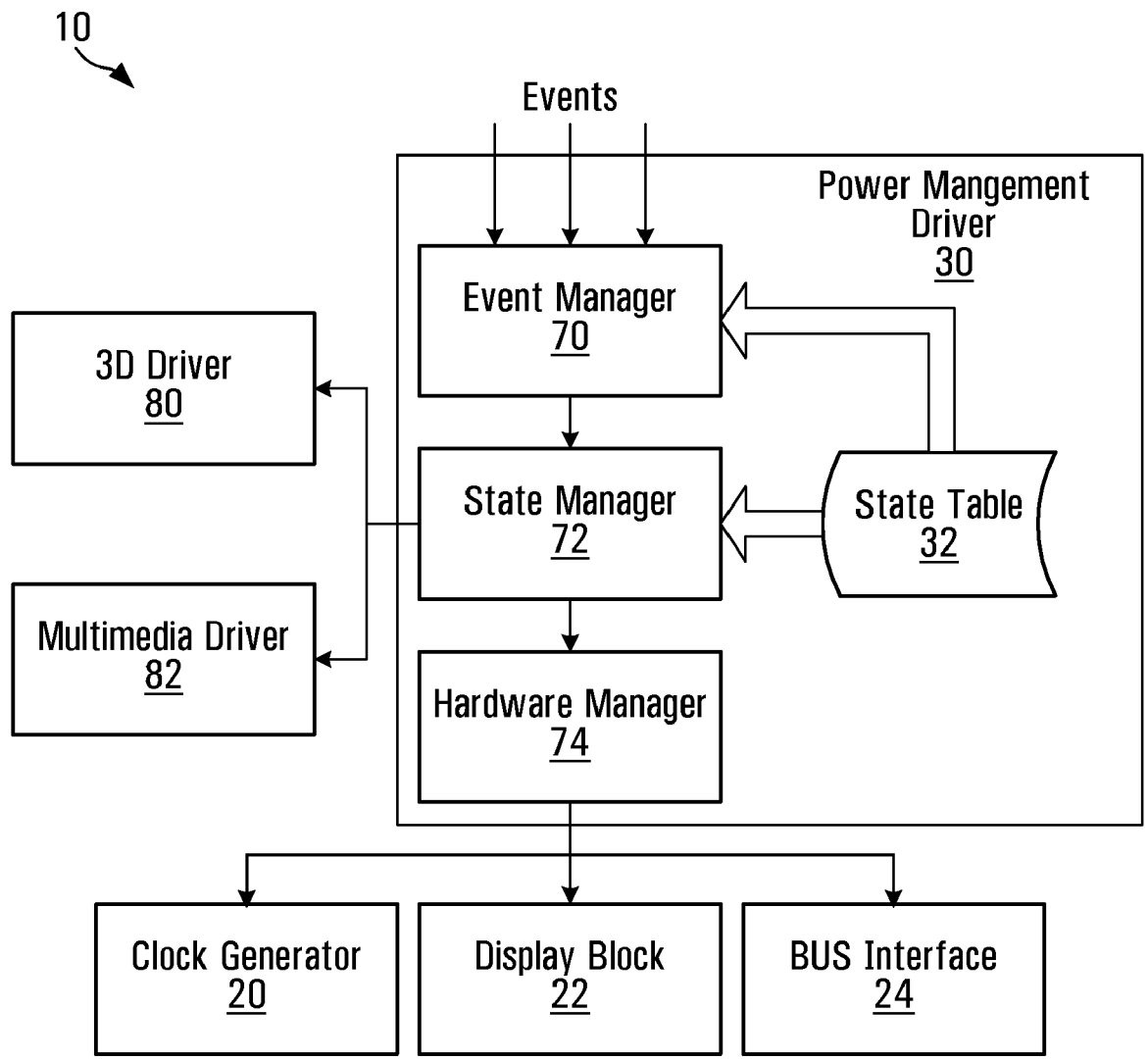
FIG. 1 is a schematic diagram illustrating a graphics processing unit, which is an example of a power-consuming device.

FIG. 1 illustrates a particular type of power-consuming device, namely, a graphics subsystem (GSS) 10. The GSS 10 is a combination of hardware and software components whose purpose is to generate two-dimensional, three-dimensional and/or multimedia graphics for display by an electronic computing device to which it is electrically connected (the "host device"). The hardware of GSS 10 includes a graphics processing unit (GPU) which is not expressly shown. The GSS 10 may be implemented as a single application-specific integrated circuit (ASIC) and, depending upon the nature of the host device, may be integrated directly with other circuitry of the device (e.g. as part of an integrated graphics solution) or may constitute a dedicated graphics card that is connected to a motherboard of the device via a local bus. Host devices with which the GSS 10 may be used may include personal computers, notebook or laptop computers, portable video game units, portable digital assistants (PDAs), cellular telephones and the like. Depending upon the nature of the host device, the host device may have a cathode ray tube (CRT), a liquid crystal display (LCD) screen, or other type of display upon which the generated graphics are displayed.

The GSS 10 effects a power management scheme, which is a focus of the present description. Only components pertaining to the power management scheme are shown in FIG. 1. The illustrated components include hardware components as well as software components. The hardware components include a clock generator 20, a display block 22, and a bus interface 24. The software components include a power management driver 30, a 3D driver 80, and a multimedia driver 82. These software components may form part of an overall software product which may be referred to as a graphics driver.

Examining the hardware components first, clock generator 20 is an oscillator or any other clock source within the GSS 10 that is capable of generating at least one clock signal for driving sequential logic within the GSS (e.g. a phase-locked loop—PLL—circuit). In the present embodiment, the clock source is capable of generating at least two separate clock signals: a system clock signal for driving a processor of device 10 and a memory clock signal for driving a memory (e.g. dynamic random access memory) of device 10. The clock generator 20 includes hardware registers to which values may be written in order to control the operation of the generator 20. For example, certain characteristics of the clock signals generated by generator 20, such as clock frequency, may be controlled by writing appropriate values to the clock generator registers.

Display block 22 is circuitry within the GSS 10 which is generally responsible for generating signals to present images on the display of the host device. The term "block" denotes the fact that the circuitry may be a subset (or "block") of the overall circuitry of a GSS ASIC. The display block 22 includes hardware registers to which values may be written in order to control certain characteristics of the display, including the refresh rate of the display. As is known in the art, the refresh rate of a display has an impact on the power consumed by the device.

Bus interface 24 is circuitry within the GSS 10 which serves as an interface to a computer bus to which the GSS 10 may be connected. The bus may be a Peripheral Component Interconnect-Express (PCI-E) bus for example. The bus interface 24 includes hardware registers to which values may be written in order to control certain operating characteristics of the bus. For example, in the case of PCI-E, the operative number of lanes (which also bears upon power consumption) may be specified.

Power management driver 30 is a software component that is generally responsible for effecting the power management scheme at the GSS 10 that is a focus of the present disclosure. The power management driver 30 maintains a state table 32 and includes three software modules, namely, an event manager 70, state manager 72, and hardware manager 74.

Figure 2:
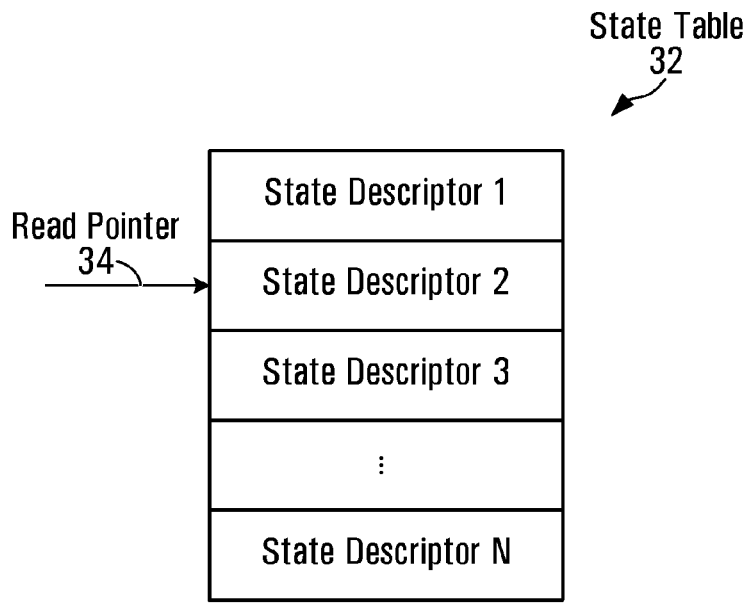
FIG. 2 is a schematic diagram illustrating a power consumption state table in memory of the device of FIG. 1.

State table 32, which is illustrated in greater detail in FIG. 2, is a table in host device (CPU) memory which stores descriptors for each of a set of N predefined power consumption states, where N is a positive integer greater than one. Each of the state descriptors in table 32 describes a single power consumption state. A power consumption state defines a unique set of operating parameter values for an operating parameter set. An operating parameter is an adjustable operational setting that affects the manner in which power is consumed by the GSS 10. Each operating parameter is typically associated with a hardware or software component of the GSS 10. Different operating parameter values result in different levels of power consumption for that component when applied. An operating parameter value is said to be applied when it is effected by the component so as to affect the power consumption behaviour of the relevant component. This may be achieved by communicating the value to the component, which may store the value, e.g., in one or more hardware registers or in a software variable. If the entire set of operating parameter values defined for a power consumption state is applied at the GSS 10, a particular level power consumption is achieved. This level is said to be the power consumption level that is associated with that state. The N states defined in table 32 are ordered by associated power consumption level, from least power consumed (state descriptor 1) to most power consumed (state descriptor N). For two adjacent states in table 32, at least one parameter value will differ between the states. However, in the present embodiment, no parameter value in the state with the lower associated power consumption level will have a value representing a degree of power consumption (for the relevant GSS component to which the parameter pertains) that is higher than the corresponding value in the state with the higher associated power consumption level. The latter may not be true for all embodiments. As shown in FIG. 2, a read pointer 34 used by the power management driver 30 identifies a currently selected state.

Figure 3:
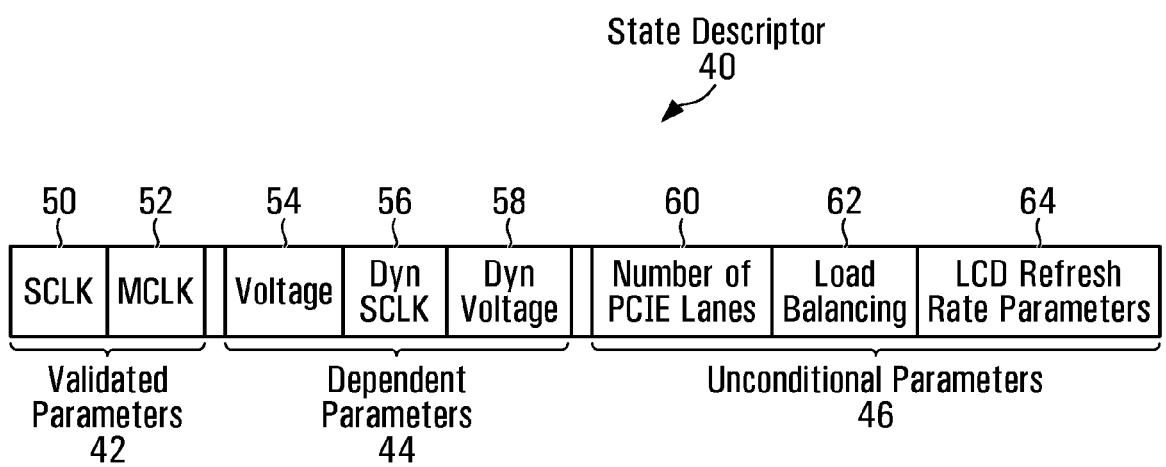
FIG. 3 is a schematic diagram illustrating an exemplary power consumption state descriptor of the table of FIG. 2.

FIG. 3 illustrates an exemplary state descriptor 40 in greater detail. As shown, state descriptor 40 describes three categories of operating parameters: validated parameters 42, dependent parameters 44, and unconditional parameters 46.

Validated parameters 42 are operating parameters which require validation before they are applied. Validation refers to the process of determining whether current device (e.g. GSS and/or host device) operating conditions are favorable for applying the parameter values. In the exemplary descriptor 40 of FIG. 3, validated parameters 42 include a system clock (SCLK) speed 50 (e.g. in MHz) and a memory clock (MCLK) speed 52 (e.g. also in MHz).

Dependent parameters 44 are operating parameters that are dependent upon one (or more) of the validated parameters 42, in the sense that the dependent parameter may only be applied once validation of an associated validated parameter has been successfully performed. In the illustrated embodiment, the dependent parameters include: a voltage 54 to be applied to GSS circuitry; a dynamic system clock scaling parameter 56 representing whether or not system clock scaling is enabled and specifying the scaling ratio; and a dynamic voltage scaling parameter 58 representing whether or not voltage scaling is enabled and some other settings, such as polarity for example. As will become apparent, in the present embodiment parameters 54 and 58 are dependent upon validated parameter 52, while parameters 54, 56 and 58 are dependent upon validated parameter 50.

Unconditional parameters 46 are operating parameters which are applied without any validation and without any dependency upon a validated parameter 42. In the exemplary descriptor 40 of FIG. 3, unconditional parameters 46 include a parameter 60 which specifies an operative number of PCI-E bus lanes, a load balancing parameter 62 which indicates whether or not load balancing between the GSS 10 and a processor of the host electronic device is to be performed, and a refresh rate parameter 64 which specifies the rate (e.g. in Hz.) at which the host device display is to be refreshed.

Turning to the software modules of power management driver 30 of FIG. 1, event manager 70 is a software module that is responsible for handling events such as interrupts, notifications, and messages which impact upon the power consumption level that should be applied at the GSS 10. The events managed by event manager 70 originate with various sources external to the power management driver 30, such as the GSS system Basic Input/Output System (BIOS), various GSS hardware, other drivers executed by the GSS 10, the operating system of the electronic device, and/or software applications executed by the electronic device. Based on detected events, the event manager 70 selects, from the set of N predefined power consumption states defined in state table 32, a desired power consumption state. It should be noted that the event manager 70 may not require, and may not actually have, access to the state table 32, as the event manager may not need to know the operating parameter values associated with each state, but may merely need know the identity of each state. The event manager 70 is also responsible for notifying the state manager 72 of the selected state.

The state manager software module 72 is responsible for state validation. As noted above, state validation refers to the process of determining whether current device operating conditions are favorable for applying the values of the validated parameters 42 associated with a particular state. State manager 72 is also responsible for selecting alternative values for validated parameters 42 for which device operating conditions are determined to be unfavorable. As will become apparent, the selection of alternative values is achieved in the present embodiment by "borrowing" (adopting) parameter values from other power consumption states defined in the table 32 so as to create a hybrid state. The device operating conditions that are examined depends upon which operating parameter is being validated, and may include current physical conditions (e.g. temperature) at the device, current user settings (e.g. whether a high resolution setting for a display requiring high bandwidth utilization has been selected by the user), and so forth. The state manager 72 is also responsible for communicating software-related operating parameter values of the ultimately validated state to the appropriate software components. For example, the value of the load balancing parameter 62 (FIG. 3) may be so communicated to the 3D driver 80 of FIG. 1 (described below). The validated state (whether hybrid or not) is also passed to the hardware manager 74, so that its hardware-related operating parameter values may be applied to the relevant hardware components of GSS 10.

The hardware manager 74 is a software module that is responsible for communicating hardware-related operating parameter values of the validated state to the appropriate hardware components of GSS 10 for application. For example, the values of SCLK and MCLK parameters 50 and 52 are communicated to the clock generator 20; the value of the PCI-E number of lanes setting 60 is communicated to bus interface 24; and the value of the LCD refresh rate parameter is communicated to display block 22. The parameter values may require conversion to appropriate hardware register values for application by the relevant hardware component.

3D driver 80 is a software component of GSS 10 which is responsible for rendering three-dimensional graphics for applications such as video games, which may be presented on the host device display.

Multimedia driver 82 is a software component which is responsible for supporting video playback for various video formats, which video may be presented on the host device display.

Figure 4:
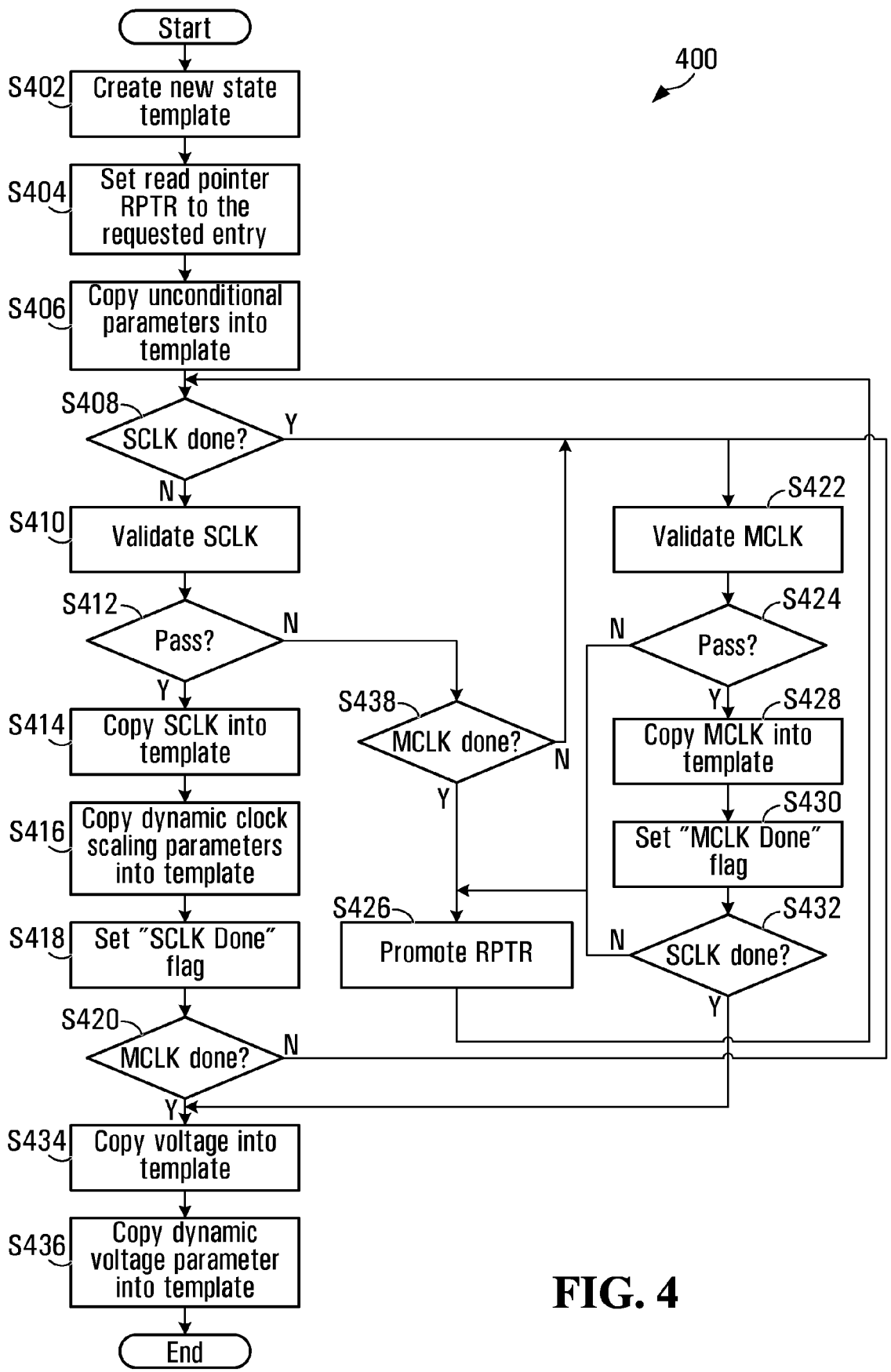
FIG. 4 is a flowchart illustrating operation of the device of FIG. 1.

Operation 400 of the power-consuming device is illustrated in FIG. 4. Operation may be triggered by a detected event which bears upon the desired power consumption level for the device.

Initially, a new state template is created (S402). A state template is simply memory (e.g. software variables) that is used to hold the operating parameter values associated with what will eventually be the validated power consumption state as the values are selected and validated. In effect, the state template is the "blank slate" into which operating parameter values will be compiled until all of the values are set and all values requiring validation have been validated.

Next, a predefined operating parameter set representing a desired power consumption state is selected from table 32 (S404). This is achieved by setting the read pointer (RPTR) 34 to point to the state descriptor in table 32 (FIG. 2) which has the desired associated power consumption level. The desired level is, for example, determined by the event manager 70 on the basis of current operating conditions at the GSS 10 and/or host device and/or on the basis of one or more detected events. In one embodiment such a detected event may be, for example, a selection made by a user, an application or the operating system. Current operating conditions that are considered may include, e.g., whether or not high resolution video is being displayed by the device and whether or not multiple displays are being driven by the device. Examples of relevant events may be a detected disconnection from an alternating current power source and switchover to battery power or a period of user inactivity. A person of ordinary skill in the art will appreciate that many other conditions and events could conceivably be considered for the purpose of selecting a desired power consumption level and corresponding state. Once selected, the desired state is communicated by the event manager 70 to the state manager 72 (FIG. 1).

At the state manager 72, the values of unconditional parameters 46 (FIG. 3) are copied from the selected state descriptor into the state template (S406, FIG. 4). These parameter values will be applied at the GSS 10 regardless of whether any operating parameter values of the desired state fail validation.

Subsequent processing is directed towards validating the parameters which require validation (in the present embodiment, the SCLK and MCLK parameters 50 and 52). A "Done" flag associated with each parameter to be validated is assumed to initially be clear in order to indicate that the parameters have not yet been validated. The gist of the processing is as follows. Each parameter to be validated is examined in turn. If a parameter passes validation, it is copied into the state template, and its associated "Done" flag is set. When all validation parameters 42 have been examined, if any parameters associated with the current state have failed validation, the next higher power consumption state is selected, and validation is re-attempted for each parameter remaining to be validated (i.e. only parameters whose "Done" flag is not yet set are examined). Operation ends when all relevant parameters have been validated or when the end of the state table is reached.

More specifically, upon determining that the SCLK parameter 50 is as yet not validated (S408), the state manager attempts to validate the parameter (S410). If the validation determines that current operating conditions of the GSS 10 and/or host electronic device are favorable for applying the value of parameter 50 (S412), the value is copied to the state template (S414).

Thereafter, the value of dynamic SCLK parameter 56 is also copied to the state template (S416) in view of the dependency of parameter 56 upon the validated SCLK parameter 50. An "SCLK done" flag is then set to indicate that validation of the SCLK parameter is complete (S418).

The above process is then essentially repeated for the MCLK parameter value 52 (starting at S420). In the case of this parameter, it is assumed that the validation (S422) initially fails (S424). This failure may be due to the fact that current GSS and/or host device operating conditions are unfavorable for applying the value of the MCLK parameter 52 of the selected state. In view of the failure, an attempt is made to modify the operating parameter value to a new value for which operating conditions are not unfavorable. Specifically, the read pointer 34 is advanced (S426) to point to the next state descriptor in the state table 32 (FIG. 2). The next state descriptor represents the state with the next highest associated overall power consumption level for the GSS 10, as compared with the level associated with the initially selected state, of all of the states represented in table 32.

At this stage, when validation is performed (S422) it is assumed that the validation passes (S424). The value of MCLK parameter 52 is accordingly copied to the state template (S428), and an "MCLK done" flag is then set to indicate that validation of the MCLK parameter is complete (S430).

Thereafter, because the "SCLK done" flag has already been set (S432), and given the successful validation of the MCLK parameter value 52, the values of the voltage parameter 54 and dynamic voltage parameter 58 are also copied to the state template (S434, S436) in view of the dependency of the parameters 54 and 58 upon the SCLK parameter 50 and MCLK parameter 52.

At this stage, all of the parameter values in the state template have been set and all parameters requiring validation have been validated. The set of values in the state template constitutes a modified set of parameters which represents a validated, "hybrid" state. This hybrid state has been formed by combining parameter values from adjacent states in table 32.

Operation 400 may now complete, and the state manager 72 and hardware manager 74 may thereafter communicate the modified set of parameters of the hybrid state to the appropriate software and hardware components of GSS 10 for application.

It is noted that, if the SCLK validation had failed (S412), then further processing (S422 or S426) would have depended upon the result of a check of the MCLK done flag (S438), as will be apparent from FIG. 4.

Advantageously, the power management scheme described herein potentially allows many different hybrid power consumption states to be created dynamically. Absent such dynamic creation of hybrid states, it might otherwise be necessary to predefine an excessive number of potential hybrid states in anticipation of various validation failure scenarios or to apply an operating parameter set whose power consumption is higher than desired simply because one parameter failed validation. The approach described herein accordingly reduces the number of state descriptors requiring storage and promotes a greater degree of power conservation as compared with alternative approaches.

It will be appreciated that, in some embodiments, a hybrid state could be formed from parameter values from more than two states. The multiple states need not necessarily be adjacent in table 32.

It will be appreciated that many aspects of the above-described operation can be implemented in software, firmware and/or hardware. In some embodiments, operation may be implemented entirely in software or firmware, provided that the ultimately validated operating parameter set is applied in software (e.g. by setting variables in a software application, applet, library, utility or process whose execution impacts upon power consumption). Such software or firmware may take the form of machine-executable code stored on a machine-readable medium, such as an optical disk or magnetic tape for example, which is ultimately loaded, either directly or indirectly, to the device.

As will be appreciated by those skilled in the art, modifications to the above-described embodiment can be made without departing from the essence of the invention. For example, the present disclosure describes a power management scheme for a GSS 10. Of course, the same scheme could be used for any power-consuming device, whether electrical or otherwise.

The above-described embodiment incorporates a state table defining N power consumption states ordered by associated power consumption level. It will be appreciated that the power consumption states could be represented in numerous other ways. For example, a linked list could be used to organize states. In some cases, states may not be ordered by power consumption level. For instance, states may simply be identified by type. A state manager algorithm may simply search for a desired state to be validated by its associated type once the event manager has identified the desired type. The name of each state type may reflect the situation in which the relevant operating parameter set should be applied (e.g. a state of type "thermal" may define operating parameter values that are desirable for application when it is desired to limit heat output).

Other modifications will be apparent to those skilled in the art and, therefore, the invention is defined in the claims.

What is claimed is:

1. A method of operating a power-consuming device, comprising:
    selecting one of a plurality of predefined operating parameter sets, each of said operating parameter sets comprising a plurality of operating parameter values for said device defining a power consumption state, wherein said plurality of operating parameters values in each of said predefined operating parameter sets include adjustable operating parameter values and dependent operating parameters dependent on said adjustable operating parameter values;
    modifying to a new value at least one of said adjustable operating parameter values in said selected set that would prevent said device from meeting current operating demands to meet said current operating demands, wherein said new value of said adjustable operating parameter is taken from another operating parameter set of said plurality of predefined operating parameter sets; and modifying to a new value any dependent operating parameter dependent on said at least one of said adjustable operating parameter values in said selected set, said modifying resulting in a modified set of parameters; and
    applying said modified set of parameters to said device, to change said current power consumption state of said device.

2. The method of claim 1 wherein said selected set is associated with a first level of power consumption by said device and wherein said another operating parameter set is associated with a second level of power consumption by said device that is higher than said first level.

3. The method of claim 2 wherein said another operating parameter set is identified based on an absence of any other operating parameter set in said plurality of predefined operating parameter sets that has an associated level of power consumption for said device greater than said first level of power consumption and less than said second level of power consumption.

4. The method of claim 1 wherein each of said operating parameter values determines a level of power consumption for a component of said device.

5. The method of claim 4 wherein said new value has an associated level of power consumption for a component of said device that is higher than a level of power consumption for said component prior to said modifying.

6. The method of claim 1 wherein said selecting, modifying and applying are responsive to a detected event.

7. The method of claim 6 wherein said detected event is selected from the set consisting of switching from an alternating current power source to a battery power source, a period of user inactivity at the device, a selection made by a user, a selection made by an application, or a selection made by the operating system.

8. The method of claim 1 wherein said current operating demands are selected from the set consisting of whether or not video is being displayed, whether or not multiple displays are being supported, a currently operative resolution setting for displayed images, and a physical condition of the device.

9. The method of claim 1 wherein the operating parameters include at least one of a voltage level for electronic circuitry at the device, a frequency of a clock signal at the device, a dynamic frequency scaling enable/disable setting, a dynamic voltage scaling enable/disable setting, a bus configuration setting, a setting indicating whether load balancing is to be performed between said device and another device, and a display screen refresh rate.

10. A power-consuming device, comprising:
   means for selecting one of a plurality of predefined operating parameter sets, each of said operating parameter sets comprising a plurality of operating parameter values for said device defining a power consumption state, wherein said plurality of operating parameters values in each of said predefined operating parameter sets include adjustable operating parameter values and dependent operating parameters dependent on said adjustable operating parameter values;
   means for modifying to a new value at least one of said adjustable operating parameter values in said selected set that would prevent said device from meeting current operating demands to meet said current operating demands, wherein said new value of said adjustable operating parameter is taken from another operating parameter set of said plurality of predefined operating parameter sets;
   means for modifying to a new value any dependent operating parameter dependent on said at least one of said adjustable operating parameter values in said selected set, said modifying resulting in a modified set of parameters; and
   means for applying said modified set of parameters to said device, to change said current power consumption state of said device.

11. The device of claim 1 wherein said selected set is associated with a first level of power consumption by said device and wherein said another operating parameter set is associated with a second level of power consumption by said device that is higher than said first level.

12. The device of claim 11 wherein said another operating parameter set is identified based on an absence of any other operating parameter set in said plurality of predefined operating parameter sets that has an associated level of power consumption for said device greater than said first level of power consumption and less than said second level of power consumption.

13. The device of claim 10 wherein each of said operating parameter values determines a level of power consumption for a component of said device.

14. The device of claim 13 wherein said new value has an associated level of power consumption for a component of said device that is higher than a level of power consumption for said component prior to said modifying.

15. The device of claim 10 wherein said means for selecting, means for modifying and means for applying are activated responsive to a detected event.

16. The device of claim 15 wherein said detected event is selected from the set consisting of switching from an alternating current power source to a battery power source, a period of user inactivity at the device, a selection made by a user, a selection made by an application, or a selection made by the operating system.

17. The device of claim 10 wherein said current operating demands are selected from the set consisting of whether or not video is being displayed, whether or not multiple displays are being supported, a currently operative resolution setting for displayed images, and a physical condition of the device.

18. The device of claim 10 wherein the operating parameters include at least one of a voltage level for electronic circuitry at the device, a frequency of a clock signal at the device, a dynamic frequency scaling enable/disable setting, a dynamic voltage scaling enable/disable setting, a bus configuration setting, a setting indicating whether load balancing is to be performed between said device and another device, and a display screen refresh rate.

19. A machine-readable medium storing machine-executable code for execution by a power-consuming device, comprising:
   machine-executable code for selecting one of a plurality of predefined operating parameter sets, each of said operating parameter sets comprising a plurality of operating parameter values for said device defining a power consumption state, wherein said plurality of operating parameters values in each of said predefined operating parameter sets include adjustable operating parameter values and dependent operating parameters dependent on said adjustable operating parameter values;
   machine-executable code for modifying to a new value at least one of said adjustable operating parameter values in said selected set that would prevent said device from meeting current operating demands to meet said current operating demands, wherein said new value of said adjustable operating parameter is taken from another operating parameter set of said plurality of predefined operating parameter sets;
   machine executable code for modifying to a new value any dependent operating parameter dependent on said at least one of said adjustable operating parameter values in said selected set, said modifying resulting in a modified set of parameters; and
   machine-executable code for applying said modified set of parameters to said device, to change said current power consumption state of said device.

20. The machine-readable medium of claim 19 wherein said selected set is associated with a first level of power consumption by said device and wherein said another operating parameter set is associated with a second level of power consumption by said device that is higher than said first level.

21. The machine-readable medium of claim 20 wherein said another operating parameter set is identified based on an absence of any other operating parameter set in said plurality of predefined operating parameter sets that has an associated level of power consumption for said device greater than said first level of power consumption and less than said second level of power consumption.

22. The machine-readable medium of claim 19 wherein each of said operating parameter values determines a level of power consumption for a component of said device.

23. The machine-readable medium of claim 22 wherein said new value has an associated level of power consumption for a component of said device that is higher than a level of power consumption for said component prior to said modifying.

24. The machine-readable medium of claim 19 wherein said machine-executable code for selecting, machine-executable code for modifying and machine-executable code for applying are responsive to machine-executable code for detecting an event.

25. The machine-readable medium of claim 24 wherein said event is selected from the set consisting of switching from an alternating current power source to a battery power source, a period of user inactivity at the device, a selection made by a user, a selection made by an application, or a selection made by the operating system.

26. The machine-readable medium of claim 19 wherein said current operating demands are selected from the set consisting of whether or not video is being displayed, whether or not multiple displays are being supported, a currently operative resolution setting for displayed images, and a physical condition of the device.

27. The machine-readable medium of claim 19 wherein the operating parameters include at least one of a voltage level for electronic circuitry at the device, a frequency of a clock signal at the device, a dynamic frequency scaling enable/disable setting, a dynamic voltage scaling enable/disable setting, a bus configuration setting, a setting indicating whether load balancing is to be performed between said device and another device, and a display screen refresh rate.

* * * * *

UNITED STATES PATENT AND TRADEMARK OFFICE
CERTIFICATE OF CORRECTION

PATENT NO.       : 7,624,287 B2                                    Page 1 of 1
APPLICATION NO.  : 11/468630
DATED            : November 24, 2009
INVENTOR(S)      : Khodorkovsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

Page 1 of 1

PATENT NO.       : 7,624,287 B2
APPLICATION NO.  : 11/468630
DATED            : November 24, 2009
INVENTOR(S)      : Khodorkovsky et al.

It is certified that error appears in the above-identified patent and that said Letters Patent is hereby corrected as shown below:

Column 9,
Line 56, "device of claim 1 wherein" should be changed to --device of claim 10 wherein--

Signed and Sealed this
First Day of March, 2011

David J. Kappos
*Director of the United States Patent and Trademark Office*